United States Patent [19]

Klose

[11] Patent Number: 4,781,232
[45] Date of Patent: Nov. 1, 1988

[54] PNEUMATIC VEHICLE TIRE BEAD STRUCTURE

[75] Inventor: Hans-Ulrich Klose, Wiedensahl, Fed. Rep. of Germany

[73] Assignee: Continental Aktiengesellschaft, Hanover, Fed. Rep. of Germany

[21] Appl. No.: 8,577

[22] Filed: Jan. 29, 1987

[30] Foreign Application Priority Data

Jan. 31, 1986 [DE] Fed. Rep. of Germany ....... 3602874

[51] Int. Cl.⁴ .............................................. B60C 15/04
[52] U.S. Cl. ..................................... 152/540; 152/544
[58] Field of Search ............... 152/539, 540, 544, 547, 152/379.3, 379.4, 379.5, 380, 381.3, DIG. 20; 156/136; 245/1.5

[56] References Cited

U.S. PATENT DOCUMENTS

| | | | |
|---|---|---|---|
| 1,503,883 | 8/1924 | Cobb | 152/540 X |
| 4,516,617 | 5/1985 | Seitz et al. | 157/1 |
| 4,561,919 | 12/1985 | Forsyth | 152/539 X |
| 4,597,426 | 7/1986 | Mauk et al. | 152/380 X |

FOREIGN PATENT DOCUMENTS

| | | |
|---|---|---|
| 3000428 | 3/1984 | Fed. Rep. of Germany . |
| 3246624 | 6/1984 | Fed. Rep. of Germany . |
| 3406926 | 9/1985 | Fed. Rep. of Germany ...... 152/541 |
| 768478 | 2/1957 | United Kingdom ................ 152/540 |

Primary Examiner—Michael W. Ball
Assistant Examiner—Geoffrey L. Knable
Attorney, Agent, or Firm—Becker & Becker, Inc.

[57] ABSTRACT

A pneumatic vehicle tire made of rubber or rubber-like material and having a reinforcing carcass that is anchored in the beads by being looped around bead cores that are essentially inextensible and/or resistant to compression. The bead cores have an essentially round overall cross-sectional shape. To increase the bending resistance of the bead cores, each bead core has an inner region of steel or other material of similar high strength and rigidity. Each inner region has a cross-sectional shape that is characterized by a dimension, in the radial direction of the bead core, that is greater than its dimension in the axial direction. Each bead core also has an outer region, of lightweight material, that complements the inner region to provide the essentially round overall cross-sectional shape for the bead core.

4 Claims, 2 Drawing Sheets

PNEUMATIC VEHICLE TIRE BEAD STRUCTURE

BACKGROUND OF THE INVENTION

1. Field of the Invention

The present invention relates to a pneumatic vehicle tire made of rubber or rubber-like material and having a reinforcing carcass that is anchored in the beads by being looped around bead cores that are essentially inextensible and/or resistant to compression; the bead cores have an essentially round cross-sectional shape.

2. Description of the Prior Art

German Offenlegungsschrift 30 00 428 Rach et al dated Mar. 29, 1984 describes a vehicle wheel and tire assembly where the beads of the tire are disposed on the radially inner periphery of a rim. With such a principle of construction, the sealing surfaces of the tire bead are disposed in the interior of the tire. This leads to difficulties during vulcanization of the tire. In addition, the bead cores found in the tire beads are predominantly subjected to compressive load and possibly slightly to tensile load.

To resolve the problem of vulcanization, it was proposed in German Offenlegungsschrift 32 46 624 to Frerichs et al dated June 20, 1984 vulcanize the tire with the sidewalls and side beads opened laterally outwardly. To mount the tire, it is then necessary to pivot the tire beads somewhat about their bead cores. U.S. Pat. No. 4,516,617, Seith et al dated May 14, 1985 which belongs to the assignee of the present application, describes a method by which such a tire can be mounted on a one-piece rim.

With the heretofore known vehicle wheel and tire assemblies where the tire beads are disposed on the radially inner periphery of a rim, the bead cores predominantly have the same cross-sectional shape and the same rigidity as do conventional tires where the beads are disposed on the radially outer periphery of a rim. Thus, the heretofore known bead cores are relatively heavy.

It is an object of the present invention to provide a pneumatic vehicle tire of the aforementioned general type with bead cores that have a relatively high resistance to compression and bending, and that in addition are as lightweight as possible. It is also necessary to provide a pivotability of the beads about their bead cores.

BRIEF DESCRIPTION OF THE DRAWINGS

This object, and other objects and advantages of the present invention, will appear more clearly from the following specification in conjunction with the accompanying schematic drawings, in which.

SUMMARY OF THE INVENTION

The pneumatic vehicle tire of the present invention is characterized primarily in that each bead core has an inner region of steel or a material of similar high strength in rigidity, with this inner region having a cross-sectional shape that is characterized by a dimension, in the radial direction of the bead core, that is greater than its dimension in the axial direction; each bead core also has an outer region, of lightweight material, that complements the inner region to provide the essentially round overall cross-sectional shape for the bead core.

As a result of the present invention, there is obtained not only a considerably lighter tire, but the latter is also considerably cheaper to produce since less steel is required. Furthermore, more possibilities are provided for designing the cross-sectional shape of the bead cores, so that the bead cores can now be easily adapted to actual requirements.

The main concept of the present invention is to design the bead cores in such a way that the portion comprising steel wires, which portion predominantly contributes to the bending resistance of the core ring, has as great a moment of surface inertia as possible. This is achieved by having the majority of that portion of the bead core that is comprised of steel wires disposed as far as possible from the bending line or plane. This is realized with cross-sectional shapes where the dimension in the radial direction of the bead core ring is greater than the dimension in the axial direction. So that in addition to the great resistance to bending of the bead core achieved by these measures, a pivotability of the tire bead about the bead core is achieved, the inner region of the bead core, which is comprised of steel wires, has sprayed or injected therearound a material that is as lightweight as possible, with the quantity of this material being sufficient to complete a round cross-sectional shape for the bead core. For an easier pivotability, it is advantageous to embed the bead core in the tire bead in a non-adhering manner. This can be accomplished by measures known per se.

Further specific features of the present invention will be described in detail subsequently.

DESCRIPTION OF PREFERRED EMBODIMENTS

Figure 1:
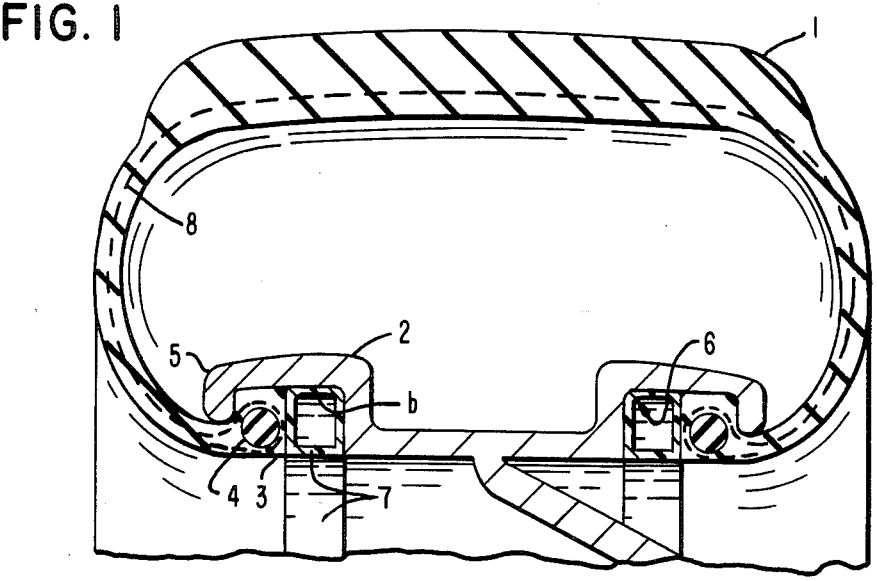
FIG. 1 is a partial radial cross-sectional view of one exemplary embodiment of a vehicle wheel and tire assembly where the tire beads, with the inventive bead cores, are disposed on the radially inner periphery of the rim.

Referring now to the drawings in detail, in the vehicle wheel and tire assembly illustrated in FIG. 1, a pneumatic vehicle tire 1 built-up essentially of rubber or rubber-like materials is mounted on a one-piece rim 2 in such a way that the tire beads 3, along with the bead cores 4 embedded therein, are disposed on the radially inner periphery of the rim 2 next to rim flanges 5 that essentially extend radially inwardly. A recessed portion 6 serves as a deep bed or recessed mounting portion. The recessed portion 6 is covered in a known manner by a cover ring 7. The tire can be a belted tire having a radial carcass (indicated by dashed lines in FIG. 1) that is anchored in the beads 3 by being looped around the bead cores 4, which are essentially inextensible and resistant to compression.

Figure 2:
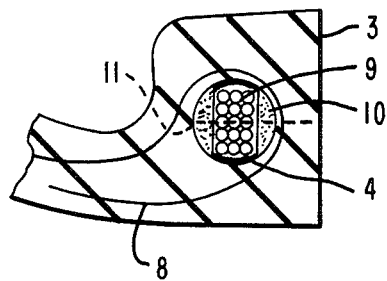
FIG. 2 is an enlarged detailed view of one exemplary embodiment of a tire bead having a bead core cross-sectional shape where the inner region essentially comprises an upright rectangle having curved short sides.
Figure 3:
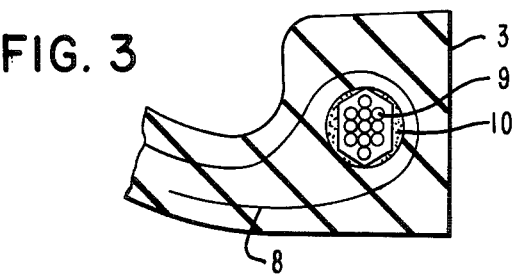
FIG. 3 is an enlarged detailed view of another exemplary embodiment of a tire bead having a bead core cross-sectional shape where the inner region essentially comprises a hexagon having cut-off side portions.

FIG. 2 is an enlarged detail of one bead region of the tire 1 of FIG. 1. A carcass 8 of conventional load-carrying-cords is anchored in the bead 3 by being looped around the bead core 4. The bead core 4 comprises two differently constructed regions, namely an inner region 9 comprised of steel wires or steel cables, and an outer region 10 comprised of a snythetic material that is as lightweight as possible. The cross-sectional shape of the inner region 9 is essentially in the form of an upright rectangle, however with the short sides already being curved outwardly in such a way that they form a portion of the circular or round surface of the overall core ring 4. Such an arrangement results in relatively large areas having an increased distance from the bending plane 11, so that the overall bead core ring 4 receives an increased bending resistance in the radial direction. Due to the two-part outer region 10 of the bead core 4, the cross-sectional shape is completed to a circular surface.

The outer region 10, which is made of a lightweight rubber or synthetic material, can be produced, for example, by being sprayed or injected onto the inner region 9. The overall core 4 should be embedded in the tire bead 3 in a non-adhering manner. As a result of the aforementioned measures, a bead core 4 is obtained that is extremely resistant to bending. In addition, the weight of the bead core is reduced, and furthermore a pivotability of the bead is ensured.

Figure 4:
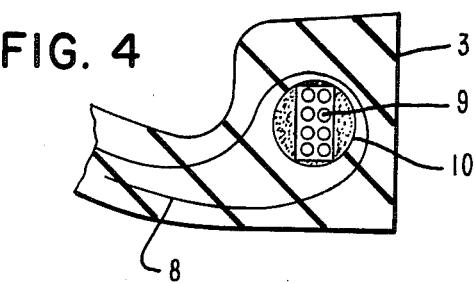
FIG. 4 is a view that shows a further exemplary embodiment of a tire bead where the inner region of the core has a rectangular cross-sectional shape.
Figure 5:
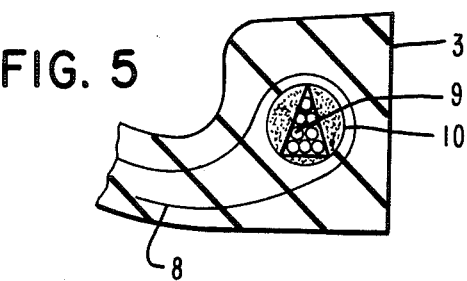
FIG. 5 is a view that shows another exemplary embodiment of a tire bead where the inner region of the core the cross-sectional shape of an isosceles triangle.
Figure 6:
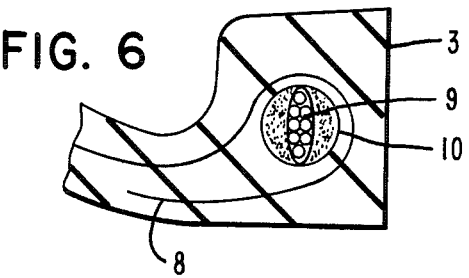
FIG. 6 is a view that shows an exemplary embodiment of a tire bead where the inner region of the core has the cross-sectional shape of an upright oval.

The embodiments of FIGS. 3 to 6 differ from the embodiment of FIG. 2 merely in the fact that they illustrate a different geometrical shape for the inner region 9 of the bead core 4. For example, in FIG. 3 the inner region 9 is in the form of a hexagon, with the two vertical sides being longer than the remaining sides. In FIG. 4, the inner region 9 is in the form of a narrow, upright rectangle that is again supplemented by the outer region 10 to provide the overall core with a circular shape. In the embodiment of FIG. 5, the inner region 9 is formed by an isosceles triangle. FIG. 6 illustrates a further variation, with the inner region 9 being formed by an upright oval.

Figure 7:
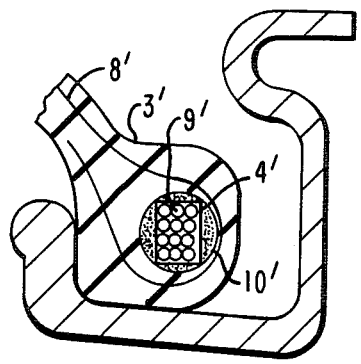
FIG. 7 is a view that shows an exemplary embodiment of a tire bead that is disposed on the radially outer periphery of a rim and that has a bead core cross-sectional shape where the inner region is formed by an upright parallelogram.

FIG. 7 illustrates how the present invention can basically also be used with tires that have their beads disposed on the radially outer periphery of a rim. In such an arrangement, the pivotability of a bead is required for the so-called rotating beads, which are utilized when a support part is disposed in the middle of the rim for emergency operation; such a configuration is illustrated, for example, in the vehicle tire and wheel assembly of German Offenlegungsschrift 33 38 971 Huinink et al corresponding to U.S. application Ser. No. 665,305—Huinink et al filed Oct. 26, 1984, now abandoned, and replaced by continuation application of co-pending Ser. No. 904,791—Huinink et al filed Sept. 4, 1986. The bead core 4' is again comprised of an inner region 9' that is constructed of steel cables or steel wires, and that has a cross-sectional shape of an upright rectangle. Any of the previously described cross-sectional shapes could, of course, also be used. The outer region 10' is again comprised of a lightweight rubber or synthetic material, and supplements the inner region 9' to provide the overall core 4' with a round or circular cross-sectional shape. The core 4' is again embedded in the bead 3' in a non-adhering manner, with a carcass 8' extending around the core 4'.

Also, a radially inner portion of each of the beads is provided with a sealing surface for placement on a wheel rim.

The present invention is, of course, in no way restricted to the specific disclosure of the specification and drawings, but also encompasses any modifications within the scope of the appended claims.

What I claim is:

1. In a pneumatic vehicle tire made of rubber or rubber-like material and having a reinforcing carcass that is anchored in the beads of the tire by being looped around bead cores that are essentially inextensible and resistant to compression, with said bead cores having an essentially round overall cross-sectional shape, the improvement therewith wherein:

each of said bead cores has an inner region of high strength and rigidity, with said inner region having a cross-sectional shape that is characterized by a dimension as measured at points of greatest dimension radially and axially respectively, in the radial direction of said bead core, that differs and at maximum location thereof when in mounted position respectively is greater than dimension thereof in the axial direction; each of said bead cores also has an outer region, of lightweight material, that complements said inner region to provide said essentially round overall cross-sectional shape for said bead core, said bead cores being embedded in said beads in a non-adhering manner, and for a vulcanization process, having laterally outwardly pivoted sidewalls and beads that are to be disposed on a radially inner periphery of a wheel rim; and being provided on each of said beads with a sealing surface that, in an operational position of said tire, is disposed in the interior of said tire for placement of the beads sealingly on the radially inner periphery of the wheel rim.

2. A tire according to claim 1, in which said inner region of said bead core is made of steel wires or steel cables of high strength and rigidity.

3. A tire according to claim 1, in which the cross-sectional shape of said inner region is selected from the group consisting of a quadri-lateral four cornered configuration rectangle, a regular hexagon, a circle with cut-off sides, an isosceles triangle, and an oval.

4. A tire according to claim 1, in which said outer region of said bead core is made of rubbery material.

* * * * *